(12) United States Patent
Watanabe (10) Patent No.: US 7,051,207 B2
(45) Date of Patent: May 23, 2006

(54) APPARATUS AND METHODS FOR INSERTING AND DETECTING ELECTRONIC WATERMARK

(75) Inventor: Junya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 704 days.

(21) Appl. No.: 09/826,737

(22) Filed: Apr. 5, 2001

(65) Prior Publication Data

US 2001/0028715 A1    Oct. 11, 2001

(30) Foreign Application Priority Data

Apr. 5, 2000    (JP) ............................ 2000-102949

(51) Int. Cl.
H04L 9/00    (2006.01)
H04N 7/167    (2006.01)

(52) U.S. Cl. ...................... 713/176; 380/201; 380/203

(58) Field of Classification Search ................ 380/202, 380/203, 205, 210, 217; 713/176; 382/162, 382/163, 254, 252, 253; 715/517, 526
See application file for complete search history.

(56) References Cited

U.S. PATENT DOCUMENTS

| | | | | |
|---|---|---|---|---|
| 5,710,834 | A * | 1/1998 | Rhoads | 382/232 |
| 5,875,249 | A * | 2/1999 | Mintzer et al. | 380/54 |
| 5,930,369 | A * | 7/1999 | Cox et al. | 380/54 |
| 6,181,802 | B1 * | 1/2001 | Todd | 382/100 |
| 6,233,347 | B1 * | 5/2001 | Chen et al. | 382/100 |
| 6,330,672 | B1 * | 12/2001 | Shur | 713/176 |
| 6,359,998 | B1 * | 3/2002 | Cooklev | 382/100 |
| 6,385,329 | B1 * | 5/2002 | Sharma et al. | 382/100 |
| 6,519,351 | B1 * | 2/2003 | Kimura et al. | 382/100 |
| 6,748,362 | B1 * | 6/2004 | Meyer et al. | 704/500 |
| 6,757,405 | B1 * | 6/2004 | Muratani et al. | 382/100 |
| 6,778,678 | B1 * | 8/2004 | Podilchuk et al. | 382/100 |

FOREIGN PATENT DOCUMENTS

| | | |
|---|---|---|
| EP | 0 840 513 A2 | 5/1998 |
| EP | 0 851 679 A2 | 7/1998 |
| JP | 10-145757 | 5/1998 |
| JP | 10-191330 | 7/1998 |
| JP | 10-240129 | 9/1998 |
| JP | 10-308867 | 11/1998 |
| JP | 11-98479 | 4/1999 |

(Continued)

OTHER PUBLICATIONS

Japanese Office Action dated Aug. 10, 2004, together with English language translation.

*Primary Examiner*—Kambiz Zand
(74) *Attorney, Agent, or Firm*—Scully, Scott, Murphy & Presser, P.C.

(57) ABSTRACT

A secure electronic watermark inserter. A picture analyzer 3 analyzes an input picture 101, and decides the insertion strength of the electronic water marking to be inserted, from one pixel of the input picture 101 to another, to output the insertion strength information 104 to an electronic watermark pattern inserter 1 and to a shifting information pattern inserter 2. The electronic watermark pattern inserter 1 inserts an electronic watermark pattern 105, stored in an electronic watermark pattern storage unit 4, into the input picture 101. The key information pattern inserter 2 inserts the key information pattern 106, stored in the key information pattern storage unit 5, into a picture to be processed 102, having the inserted electronic watermark pattern, in accordance with the insertion strength information 104, to output the resulting picture.

13 Claims, 7 Drawing Sheets

FOREIGN PATENT DOCUMENTS

| | | |
|---|---|---|
| JP | 11-234264 | 8/1999 |
| JP | 11-289255 | 10/1999 |
| JP | 11-346302 | 12/1999 |
| JP | 11-355558 | 12/1999 |
| JP | 2000-13763 | 1/2000 |
| JP | 2000-50307 | 2/2000 |
| JP | 2000-151987 | 5/2000 |
| JP | 2001-285607 | 10/2001 |

* cited by examiner

CENTER POSITION OF INSERTION OF KEY INFORMATION

ACTUAL POSITION OF INSERTION OF KEY INFORMATION

APPARATUS AND METHODS FOR INSERTING AND DETECTING ELECTRONIC WATERMARK

FIELD OF THE INVENTION

This invention relates to an electronic watermark inserter, an electronic watermark detector, generally, an electronic watermark system, and methods for inserting and detecting the electronic watermark employing the inserter and the detector. More particularly, it relates to a method for preventing the electronic watermark inserted into a picture or image, termed herein as "picture" collectively, from being decoded.

BACKGROUND OF THE INVENTION

Up to now, in coping with rapidly increasing utilization of an electronic medium, such as picture, image or multimedia, an electronic watermark is embedded electronically into a picture or image for facilitating discrimination of a data source.

The furnisher of the electronic medium embeds electronic watermark signals for identifying the furnisher in the data of the electronic medium it supplies. As the electronic watermark signals are detected by the software or the hardware, the furnisher proves that is an owner of the copyright for supervising and managing the copyright.

The above-described method for inserting and extracting the aforementioned electronic watermark is disclosed in, for example, the JP Patent Kokai JP-A-10-145757 or JP Patent Kokai JP-A-10-191330.

SUMMARY OF THE DISCLOSURE

However, there is much to be desired in the conventional art.

The above-described conventional method for inserting the electronic watermark suffers a drawback that, if the parameters used in inserting the electronic watermark into the picture or the image are decoded, the electronic watermark inserted into the picture or the image may be decoded readily.

It is therefore an object of the present invention to eliminate the above drawback and to provide an electronic watermark inserter and an electronic watermark detector which render it possible to improve the secrecy of the electronic watermark inserted and methods for inserting and detecting the electronic watermark used in the electronic watermark inserter and detector.

According to an aspect of the present invention, there is provided an electronic watermark inserter for inserting an electronic watermark pattern or patterns for identifying a furnisher of a picture or image (termed "picture" collectively, herein after) into data of the picture, in which the inserter comprises: an electronic watermark pattern inserter for inserting previously generated key information pattern or patterns into a picture or pictures into which the electronic watermark pattern or patterns have been inserted and for transmitting the resulting picture or pictures.

According to a second aspect of the present invention, there is provided an electronic watermark detector for detecting an electronic watermark pattern or patterns for specifying a furnisher for a picture inserted into data of the picture, in which the detector comprises:

means for detecting a key information pattern or patterns inserted into the data of the picture along with an electronic watermark pattern or patterns, means for generating parameters required for detecting the electronic watermark pattern or patterns from the key information as detected, and means for detecting the electronic watermark pattern or patterns from the picture based on the parameters generated in the parameter generating means.

According to the third aspect of the present invention, there is also provided a method for inserting an electronic watermark pattern or patterns for identifying a furnisher of a picture or pictures into data of the picture(s), in which the method includes a step of: providing a key information pattern or patterns, a step of inserting previously provided key information pattern or patterns into a picture or pictures, into which an electronic watermark pattern or patterns have been inserted, and a step of transmitting the resulting picture or pictures.

According to a fourth aspect of the present invention, there is further provided a method for detecting an electronic watermark pattern for specifying a furnisher for a picture inserted into data of the picture, in which the method includes a step of detecting key information pattern or patterns inserted into the data of the picture or pictures along with the electronic watermark pattern or patterns, a step of generating parameters required for detecting the electronic watermark pattern or patterns from the key information pattern or patterns as detected, and a step of detecting the electronic watermark pattern or patterns from the picture or pictures based on the parameters generated.

According to a fifth aspect, there is provided an electronic watermark system comprising the electronic watermark inserter and detector according to the foregoing aspects.

Thus, the electronic watermark inserter of the present invention inserts the key information patterns at random coordinates centered about a preset interval into a picture(s) having an electronic watermark pattern(s) inserted therein.

On the other hand, the electronic watermark detector of the present invention verifies the key information pattern(s), inserted along with the electronic watermark pattern(s), to generate the electronic watermark pattern(s) from the result of the decision.

Since this restores the secret key, inserted along with the electronic watermark pattern(s), the ciphered electronic watermark pattern(s) can be detected to detect the ciphered information inserted in the picture(s).

PREFERRED EMBODIMENTS OF THE INVENTION

Figure 1:
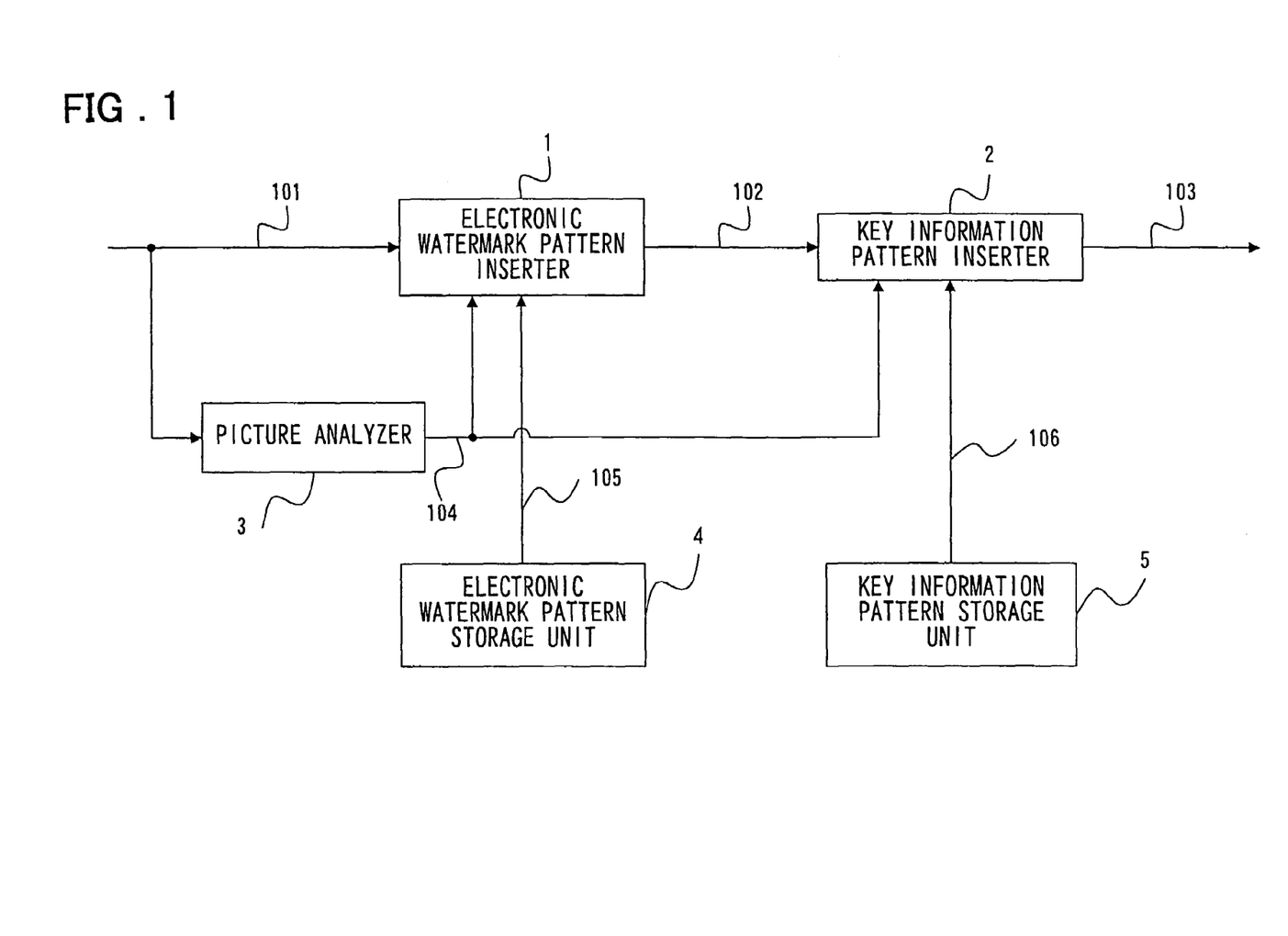
FIG. 1 is a block diagram showing the structure of an electronic watermark inserter according to an embodiment of the present invention.

Referring to the drawings, certain preferred embodiments of the present invention are explained in detail. FIG. 1 is a block diagram showing the structure of an electronic watermark inserter. In FIG. 1 the electronic watermark inserter according to the preferred embodiment of the present invention is made up of an electronic watermark pattern inserter 1, a key information pattern inserter 2, a picture analyzer 3, an electronic watermark pattern storage unit 4 and a key information pattern storage unit 5.

The picture analyzer 3 analyzes an input picture (or image) 101, such as MPEG (Moving Picture Experts Group) data, decides the insertion strength of the electronic watermark to be inserted, from one pixel to another of the input picture 101 to another, to output the insertion strength information 104 to the electronic watermark pattern inserter 1 and to the key information pattern inserter 2.

The electronic watermark pattern inserter 1 inserts an electronic watermark pattern 105, stored in the electronic watermark pattern storage unit 4, into the input picture 101, in accordance with the insertion strength information 104 from the picture analyzer 3, and outputs a picture to be processed 102, into which has been inserted the electronic watermark pattern, to the key information pattern inserter 2.

The key information pattern inserter 2 inserts key information patterns 106, stored in the key information pattern storage unit 5, into the picture to be processed 102, into which the electronic watermark pattern has been inserted by the electronic watermark pattern inserter 1, in accordance with the insertion strength information 104 from the picture analyzer 3, to output a resultant picture processed 103, into which has been inserted the key information pattern, to outside. Meanwhile, the key information pattern inserter 2 inserts the key information pattern as the patterns each shifted in a random direction, respectively.

Figure 2:
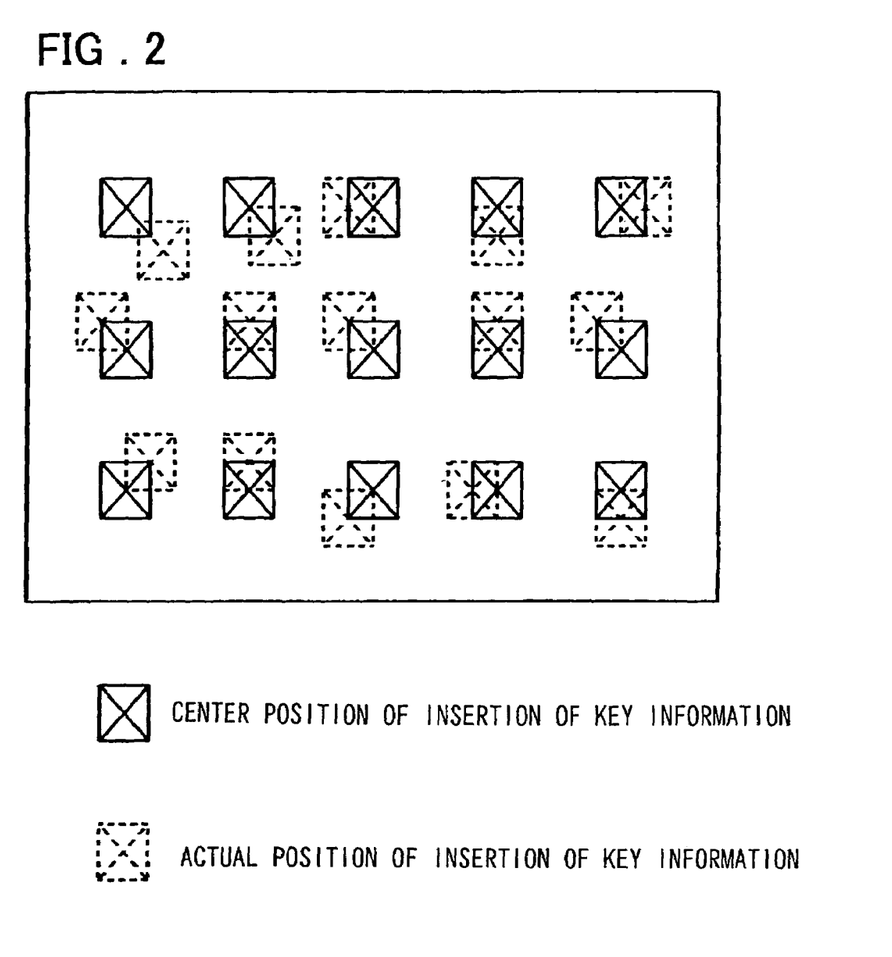
FIG. 2 shows exemplary key information patterns used in the preferred embodiment of the present invention.

FIG. 2 shows exemplary key information patterns used in an embodiment of the present invent ion. In FIG. 2, a number of key information patterns (i.e., reference or prototype original key patterns) are arranged at a present interval, as indicated by solid-line blocks in FIG. 2. The respective patterns are shifted in respective random directions, when the key information patterns are inserted by the key information pattern inserter 2 into the picture to be processed 102, into which has been inserted the electronic watermark patterns, as indicated by broken line blocks shown in FIG. 2.

Figure 3:
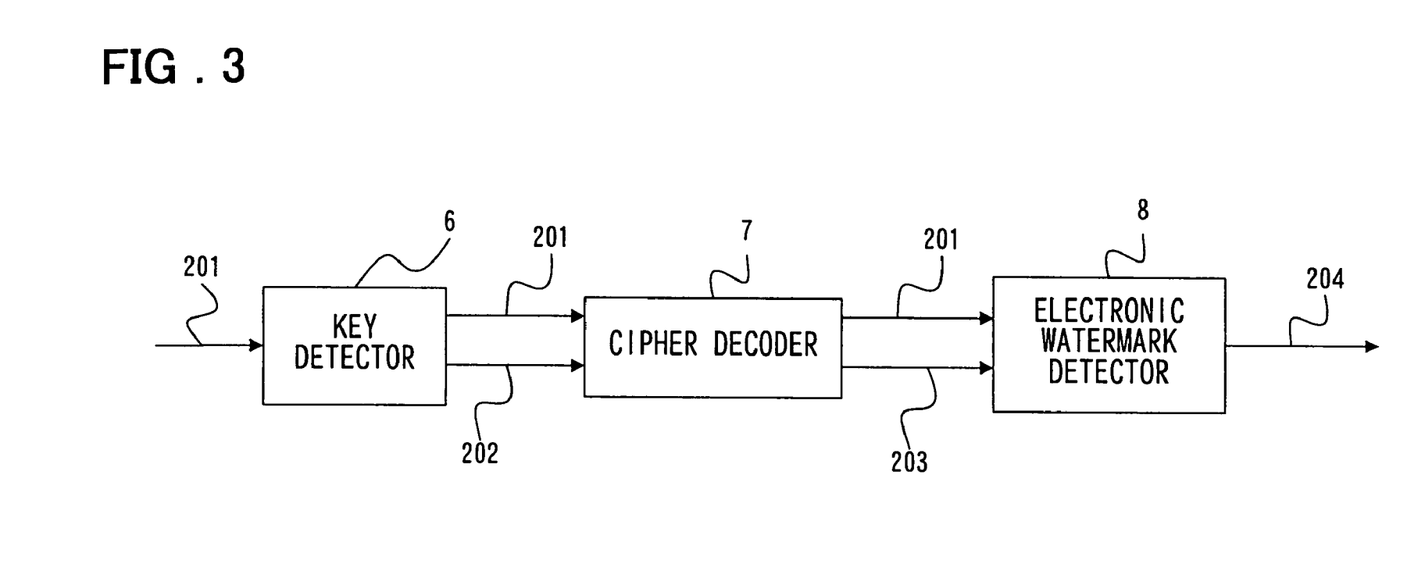
FIG. 3 is a block diagram showing the structure of an electronic watermark detector according to an embodiment of the present invention.

FIG. 3 shows a block diagram showing the structure of the electronic watermark detector according to an embodiment of the p resent invention. In FIG. 3, the electronic watermark detector according to the instant embodiment of the present invention is made up of a key detector 6, a cipher decoder 7 and an electronic watermark detector 8.

The key detector 6 detects the key information, inserted following the insertion of the electronic watermark pattern(s), from an input picture 201, to output the key information 202 detected, and the input picture 201, to the cipher decoder 7. In this case, the key detector 6 outputs the input picture 201 straightforwardly to the cipher decoder 7.

The cipher decoder 7 generates parameters required by the electronic watermark detector 8, based on the input picture 201 and the key information 202, to output the so-generated parameters and the input picture 201 to the electronic watermark detector 8. In this case, the cipher decoder 7 outputs the input picture 201 straightforwardly to the electronic watermark detector 8.

The electronic watermark detector 8 detects the electronic watermark patterns, inserted into the input picture 201, based on the parameters 203, which are required for electronic watermark detection, and which are generated by the cipher decoder 7, to output detected results 204 to outside.

Figure 4:
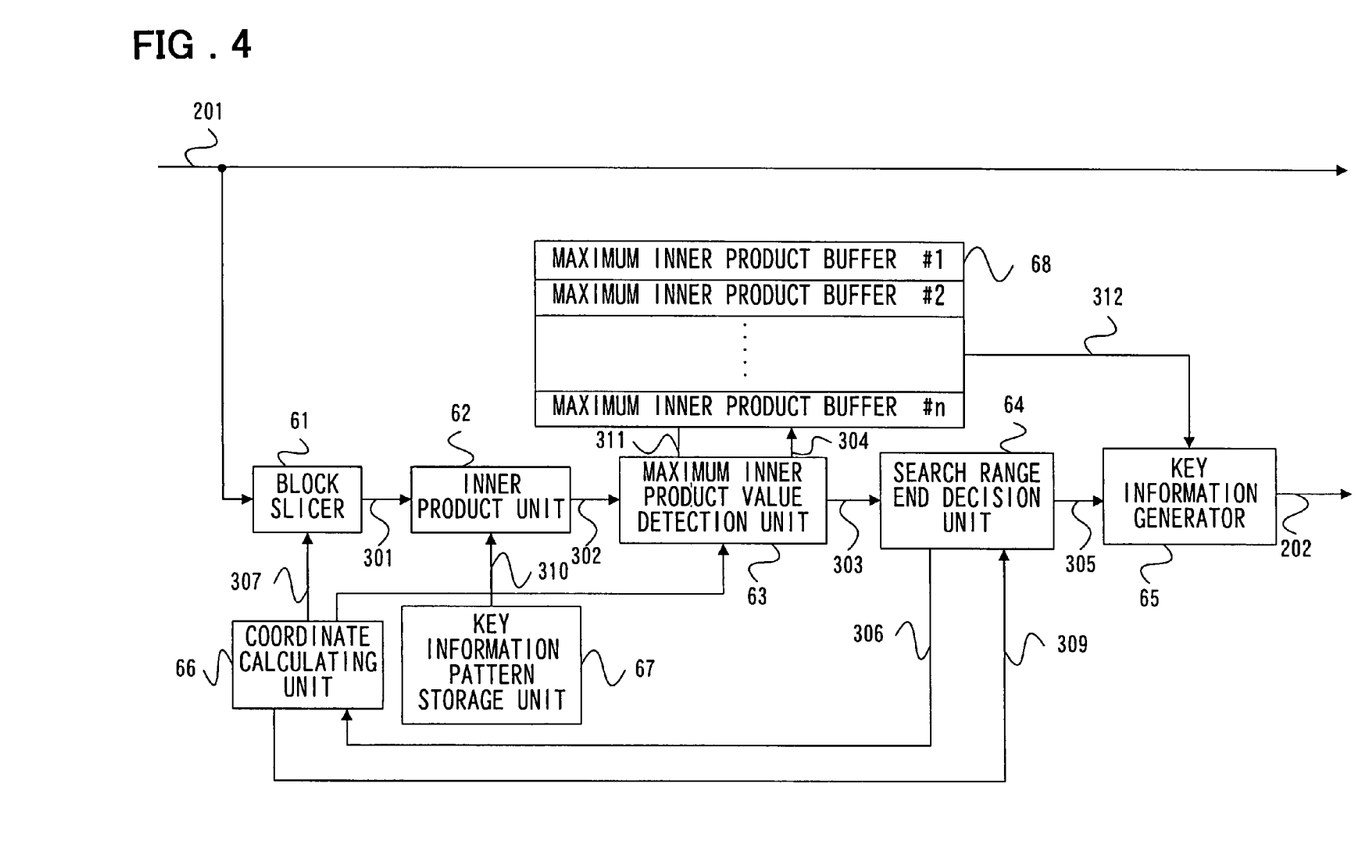
FIG. 4 is a is a block diagram showing the structure of a key detector of FIG. 3.

FIG. 4 is a block diagram showing the structure of the key detector 6. In FIG. 4, the key detector 6 is made up of a block slicer 61, an inner product unit 62, a maximum inner product value decision unit 63, a search range end decision unit 64, a key information generator 65, a coordinate calculating unit 66, a key information pattern storage unit 67 and a maximum inner product buffering unit 68.

The block slicer 61 slices one block 301 of the input picture 201, with a coordinate 307 obtained by the coordinate calculating unit 66, to output the so-sliced block 301 to the inner product unit 62. The inner product unit 62 finds an inner product of the sliced block 301 from the block slicer 61 and the key information pattern stored in the key information pattern storage unit 67 to output a result of the inner product 302 to the maximum inner product value decision unit 63.

The maximum inner product value detection unit 63 compares the result of the inner product 302 from the inner product unit 62 to the information 311 in the maximum inner product buffering unit 68. If the result shows that the inner product 302 is larger, the maximum inner product value detection unit 63 outputs the result of the inner product 302 and a coordinate 307 obtained from the coordinate calculating unit 66, that is the coordinate of the sliced-out block, to the search range end decision unit 64, as a decision result 303, while substituting a result of the inner product 304 for a corresponding value of the maximum inner product buffer in the maximum inner product buffering unit 68. It should be noted that the maximum inner product buffering unit 68 is made up of a number of maximum inner product value buffers #1 to #n corresponding to the number of key information pattern insertion positions (see FIG. 2).

When fed with an end signal 309 indicating the end of the block slicing of a preset range from the coordinate calculating unit 66, the search range end decision unit 64 outputs an end signal 305 to an enlargement/contraction rate decision unit 65. If the block slicing for a preset range is not finished, the search range end decision unit 64 outputs a command signal 306 for causing the coordinate calculating unit 66 to issue the next block slicing-out coordinate.

When fed with the end signal 305 from the search range end decision unit 64, the key information generator 65 is fed with the information 312 in the maximum inner product buffering unit 68 to generate the key information in the maximum inner product buffering unit 68 to output the key information 202 to the cipher decoder 7.

From the coordinates, by which the key information patterns have been inserted, the coordinate calculating unit 66 outputs coordinates 307, 308, shifted in +X, +Y, −X and −Y directions, respectively. The coordinate calculating unit 66 also outputs a number of coordinates 307, 308 with the number being equal to the number of the inserted key information patterns.

Figure 5:
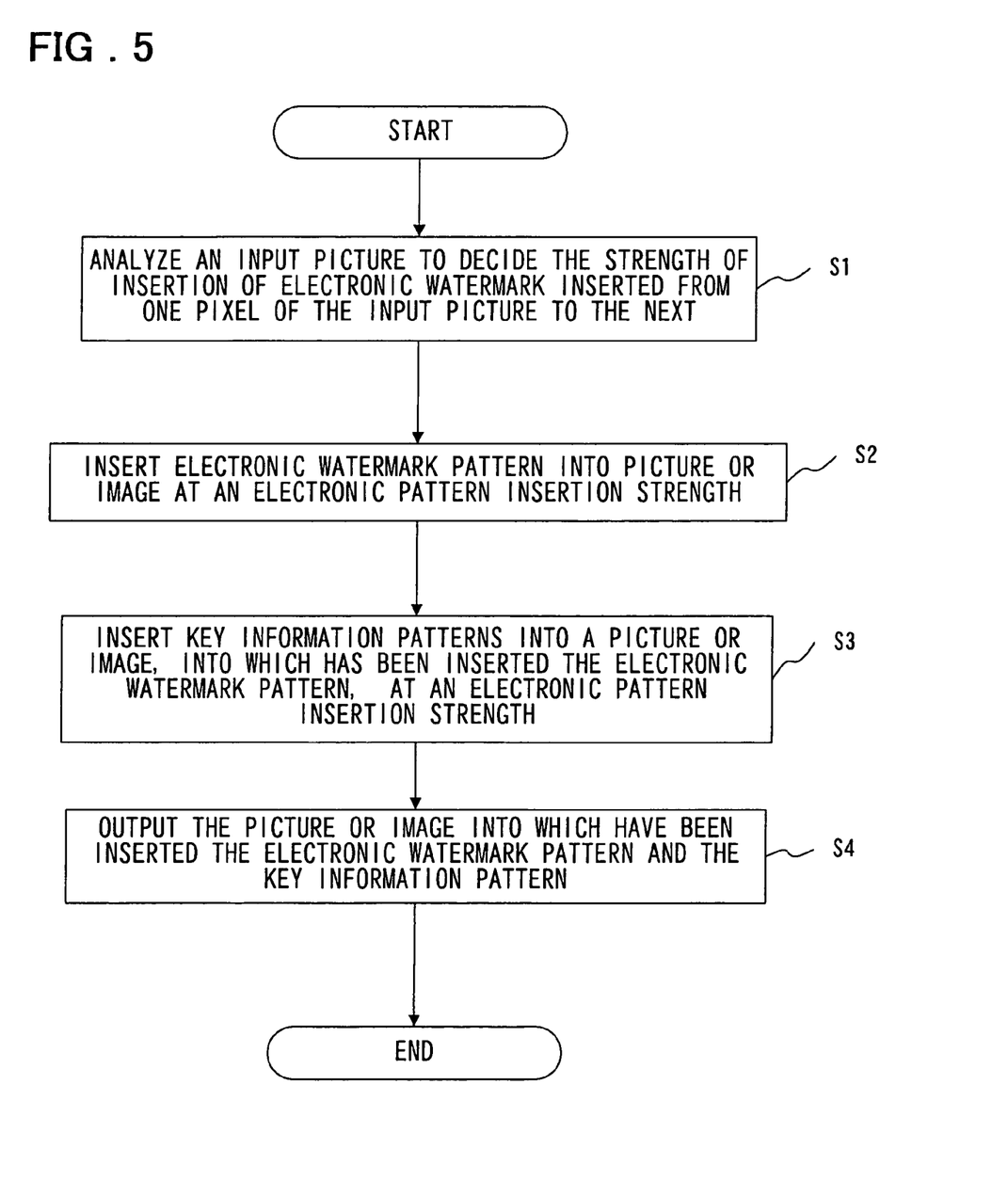
FIG. 5 is a flowchart for illustrating the processing operation of the electronic watermark inserter shown in FIG. 1.
Figure 6:
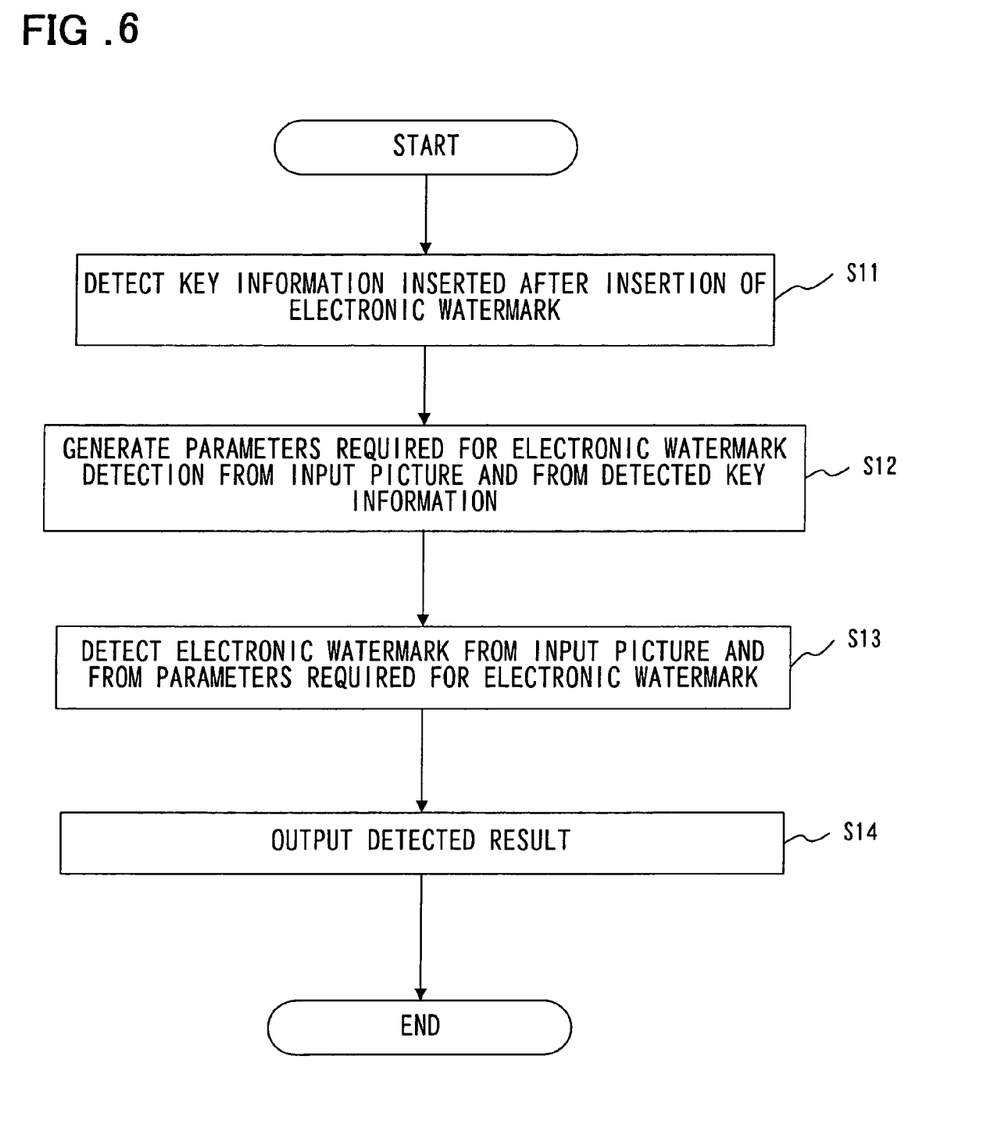
FIG. 6 is a flowchart for illustrating the processing operation of an electronic watermark inserter shown in FIG. 3.
Figure 7:
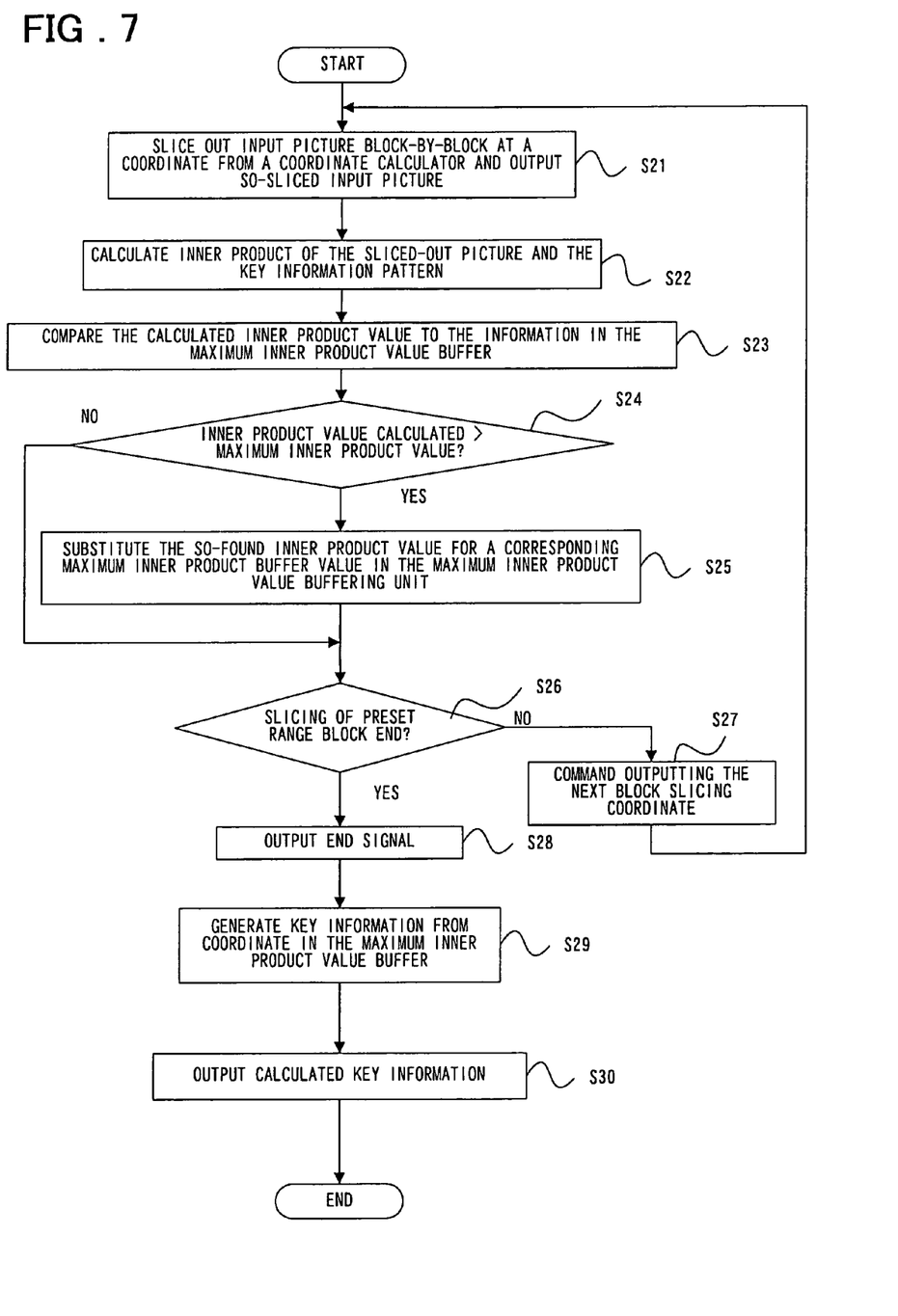
FIG. 7 is a flowchart for illustrating the processing operation of the key detector shown in FIG. 4.

FIGS. 5, 6 and 7 are flowcharts showing the processing operations of the electronic watermark inserter, shown in FIG. 1, an electronic watermark detector, shown in FIG. 3, and the key detector 6, shown in FIG. 4, respectively. Referring to FIGS. 1 to 7, the method for inserting the electronic watermark and the method for detecting the electronic watermark, according to an embodiment of the present invention, are now explained.

The picture analyzer 3 analyzes an input picture 101 (or an image) to decide the insertion strength of the electronic watermark to be inserted, from one pixel of the input picture to the next, to output the insertion strength information 104 to the electronic watermark pattern inserter 1 and to the key information pattern inserter 2 (step S1 in FIG. 5).

The electronic watermark pattern inserter 1 inserts an electronic watermark pattern 105, stored in the electronic watermark pattern storage unit 4, into the input picture 101, in accordance with the insertion strength information 104 from the picture analyzer 3, to output a picture to be processed 102, into which has been inserted the electronic watermark pattern or patterns, to the key information pattern inserter 2 (step S2 of FIG. 5).

The key information pattern inserter 2 inserts a key information pattern 106, stored in the key information pattern storage unit 5, into the picture to be processed 102, into which the electronic watermark pattern has been inserted by the electronic watermark pattern inserter 1 (step S3 in FIG. 5), to output the processed picture 103, into which has been inserted the lay information pattern, to outside (step S4 in FIG. 5).

The key detector 6 detects the key information of the input picture 201, enlarged/contracted following insertion of the electronic watermark pattern, based on the key information pattern(s) inserted into the input picture 201, to output the key information 202 and the input picture 201 to the cipher decoder 7. In this case, the key detector 6 outputs the input picture 201 straightforwardly to the cipher decoder 7 (step S11 of FIG. 6).

That is, the block slicer (sectioner) 61 in the key detector 6 slices out (sections out) one block (section or pixel) of the input picture 201 with the coordinate 306 obtained from the coordinate calculating unit 66, to output the so-sliced out block to the inner product unit 62 (step S21 of FIG. 7).

The inner product unit 62 finds the inner product of the sliced-out block 301 from the block slicer 61 and the key information pattern stored in the key information pattern storage unit 67 to output the result of the inner product 302 to the maximum inner product value detection unit 63 (step S22 of FIG. 7).

The maximum inner product value detection unit 63 compares the result of the inner product 302 from the inner product unit 62 to the information 311 in the maximum inner product buffering unit 68 (step S23 in FIG. 7). If it is the result of the inner product 302 that is larger (step S24 of FIG. 7), the maximum inner product value detection unit 63 outputs the result of the inner product 302 and the coordinate 307 obtained from the coordinate calculating unit 66 (coordinate of the sliced-out block) as being the result of the inner product 303 to the search range end decision unit 64. The maximum inner product value detection unit 63 also substitutes the result of the inner product 304 for the corresponding value in the maximum inner product value in the maximum inner product buffering unit 68 (step S25 in FIG. 7).

If the result of the inner product 302 is smaller (step 24 in FIG. 7), the maximum inner product value detection unit 63 outputs the result of the inner product 302 and the coordinate 307 obtained from the coordinate calculating unit 66 (the coordinate of the sliced-out block) as being the result of decision 303 to the search range end decision unit 64.

If the slicing out of the block of the preset range is not completed (step S26 of FIG. 7), the search range end decision unit 64 outputs a command signal 306 for causing the coordinate calculating unit 66 to output the next block slicing-out coordinate (step S27 of FIG. 7).

When fed with an end signal 309, indicating the end of slicing out of the block of the preset range from the coordinate calculating unit 66 (step S26 of FIG. 7), the search range end decision unit 64 outputs an end signal 305 to the key information generator 65 (step S28 of FIG. 7).

When fed from the end signal 305 from the search range end decision unit 64, the key information generator 65 is fed with the information 312 in the maximum inner product buffering unit 68 to generate the key information from the coordinate in the maximum inner product buffering unit 68 (step S29 in FIG. 7) to output the key information 202 to the cipher decoder 7 (step S30 in FIG. 7).

The cipher decoder 7 generates parameters required by the electronic watermark detector 8, based on the input picture 201 and on the key information 202 from the key detector 6 to output the so-generated parameters 203 and the input picture 201 to the electronic watermark detector 8 (step S12 of FIG. 6). In this case, the cipher decoder 7 outputs the input picture 201 straightforwardly to the electronic watermark detector 8.

Based on the parameters 203, required for electronic watermark detection, generated by the cipher decoder 7, the electronic watermark detector 8 detects the electronic watermark pattern or patterns inserted into the input picture 201 (step S13 of FIG. 6) to output the result of detection 204 to outside (step S14 of FIG. 6).

By inserting the electronic watermark pattern 105 to the input picture (or pictures) 101, and by then inserting into the picture or pictures the key information patterns 106, arrayed at a preset interval, and which when inserted are shifted in random directions, the electronic watermark positions are randomized, thus improving the secrecy of the inserted electronic water marking.

Moreover, by detecting the key information pattern inserted with the electronic watermark pattern, generating the parameters necessary for detecting the electronic watermark pattern from the so-detected key information pattern and by detecting the electronic watermark based on the so-generated parameters, it is possible to improve the secrecy of the inserted electronic water marking data.

By adding these processing operations to the former half and to the latter half of the electronic watermark inserter not coped with by (or not compatible with) the key information, it is possible to improve the secrecy of the inserted electronic watermark data.

The meritorious effects of the present invention are summarized as follows.

According to the electronic watermark inserter of the present invention, in which, in the electronic watermark inserter for inserting the electronic watermark pattern for specifying the furnisher of the picture or image to data of the picture or image, the key information pattern, prepared at the outset, is inserted into the picture or image, into which has been inserted the electronic watermark pattern(s), and the resulting picture or image is transmitted, it is possible to improve the secrecy of the inserted electronic watermark data.

Moreover, according to the electronic watermark detector of the present invention, in which, in the electronic watermark detector for detecting the electronic watermark pattern(s) used for specifying the furnisher of the picture or image, inserted into the picture or image, the key information pattern, inserted into the data of the picture or image, along with the electronic watermark pattern, is detected, the parameters required in detecting the electronic watermark pattern from the detected key information are generated, and the electronic watermark patterns are detected from the picture or image based on the so-generated parameters, it is possible to improve the secrecy of the inserted electronic watermark data.

It should be noted that other objects, features and aspects of the present invention will become apparent in the entire disclosure and that modifications may be done without departing the gist and scope of the present invent ion as disclosed herein and claimed as appended herewith.

Also it should be noted that any combination of the disclosed and/or claimed elements, matters and/or items may fall under the modifications aforementioned.

What is claimed is:

1. An electronic watermark inserter for inserting an electronic watermark pattern or patterns for identifying a furnisher of a picture or image, termed "picture" collectively, into data of said picture, said inserter comprising:

an electronic watermark pattern inserter for inserting previously generated key information pattern or patterns into a picture or pictures into which said electronic watermark pattern or patterns have been inserted and for transmitting the resulting picture or pictures, wherein said key information patterns are arranged at preset intervals, and wherein, upon insertion, said key information patterns are shifted in respective random directions.

2. The electronic watermark inserter as defined in claim 1 further comprising:

picture analysis means for analyzing an input picture for determining the insert ion strength of Said electronic watermark pattern into each pixel of said picture;

said electronic watermark pattern or patterns and said key information patterns being inserted in accordance with said insertion strength information.

3. An electronic watermark detector for detecting an electronic watermark pattern or patterns for specifying a furnisher for a picture or image, termed "picture" collectively, inserted into data of said picture, comprising:

means for detecting a key information pattern or patterns inserted into said data of the picture along with an electronic watermark pattern or patterns;

means for generating parameters reciuired for detecting the electronic watermark pattern or patterns from the key information as detected; and means for detecting said electronic watermark pattern or patterns from said picture based on the parameters generated in said parameter generating means.

wherein the key information patterns comprise patterns that are arranged at a preset interval at the outset and that, when inserted, are shifted each in a random direction.

4. An electronic watermark system comprising;

an electronic watermark inserter for inserting an electronic watermark pattern or patterns for identifying a furnisher of a picture or image, termed "picture" collectively, into data of said picture, said inserter comprising:

an electronic watermark pattern inserter for inserting previously generated key information pattern or patterns into a picture or pictures into which said electronic watermark pattern or patterns have been inserted and for transmitting the resulting picture or pictures, and an electronic watermark detector for detecting an electronic watermark pattern or patterns for specifying a furnisher for a picture or image, termed "picture" collectively, inserted into data of said picture, comprising:

means for detecting a key information pattern or patterns inserted into said data of the picture along with an electronic watermark pattern or patterns;

means for generating parameters required for detecting the electronic watermark pattern or patterns from the key information as detected; and means for detecting said electronic watermark pattern or patterns from said picture based on the parameters generated in said parameter generating means.

5. A method for inserting an electronic watermark pattern or patterns for identifying a furnisher of a picture or image, termed "picture" collectively, into data of said picture, said method comprising the steps of:

(a) providing a key information pattern or patterns, (b) inserting the previously provided key information pattern or patterns into a picture or pictures, into which an electronic watermark pattern or patterns have been inserted, and (c) transmitting the resulting picture or pictures, wherein said key information patterns are arranged at preset intervals, and wherein, upon insertion, said key information patterns are shifted in random directions, respectively.

6. The method as defined in claim 5 further comprising:

a step of analyzing an input picture or pictures for determining the insertion strength of said electronic watermark pattern or patterns per each pixel or section of said picture or pictures;

a step of inserting said electronic watermark pattern or patterns and said key information pattern or patterns in accordance with said insertion strength information.

7. A method for detecting an electronic watennark pattern for specifying a furnisher for a picture or image, termed "picture" collectively, inserted into data of said picture, comprising the steps of:

(a) detecting key information pattern or patterns inserted into said data of the picture or pictures alone with said electronic watennark pattern or patterns;

(b) generating parameters reciuired for detecting the electronic watermark pattern or patterns from the key information pattern or patterns as detected; and (c) detecting said electronic watermark pattern or patterns from said picture or pictures based on the parameters generated, wherein said key information patterns comprise patterns that are arranged at a preset interval at the outset and that, when inserted, are shifted in a random direction, respectively.

8. An electronic watermark inserter for inserting an electronic watermark pattern or patterns for identifying a furnisher of a picture into data of said picture, said inserter comprising:

(a) an electronic watermark pattern inserter for inserting previously generated key information pattern into a picture or pictures into which said electronic watermark pattern has been inserted and for transmitting the resulting picture or pictures, (b) means for providing said key information pattern in a predetermined specific arrangement of patterns, and (c) means for shifting, upon insertion, said patterns in random directions, pattern by pattern.

9. The electronic watermark inserter as defined in claim 8 further comprising:

a picture analysis unit analyzing an input picture for determining the insertion strength of said electronic watermark pattern into each pixel of said picture;

said electron watermark pattern and said key information pattern being inserted in accordance with said insertion strength information.

10. An electronic watermark detector for detecting an electronic watermark pattern for specifying a furnisher for a picture inserted into data of said picture, comprising:
- (a) a key information pattern detecting unit detecting a key information pattern inserted into said data of the picture along with an electronic watermark pattern;
- (b) a parameter generator generating parameters reciuired for detecting the electronic watermark pattern from the key information as detected;
- (c) a watermark pattern detector detecting said electronic watermark pattern from said picture based on the parameters generated in said parameter generator,
- wherein the key information pattern comprises patterns that are arranged at a preset interval at the outset and that, when inserted, are shifted each in a random direction.

11. A method for inserting an electronic watermark pattern or patterns for identifying a furnisher of a picture or image, termed "picture" collectively, into data of said picture, said method comprising the steps of:
- (a) providing a key information pattern or patterns;
- (b) inserting the previously provided key information pattern or patterns into a picture or pictures, into which an electronic watermark pattern or patterns have been inserted;
- (c) transmitting the resulting picture or pictures;
- wherein said key information patterns are arranged at present intervals, and wherein, when inserted, said key information patterns are shifted in random directions, pattern by pattern.

12. The method as defined in claim 11 further comprising:
- a step of analyzing an input picture or pictures for determining the insertion strength of said electronic watermark pattern or patterns per each pixel or section of said picture or pictures;
- a step of inserting said electronic watermark pattern or patterns and said key information pattern or patterns in accordance with said insertion strength information.

13. A method for detecting an electronic watermark pattern for specifying a furnisher for a picture inserted into data of said picture, comprising the steps of:
- (a) detecting key information pattern or patterns inserted into said data of the picture or pictures along with said electronic watermark pattern or patterns;
- (b) generating parameters required for detecting the electronic watermark pattern from the key information pattern as detected; and
- (c) detecting said electronic watermark pattern from said picture based on the parameters generated,
- wherein said key information pattern comprises patterns that are arranged at a present interval at the outset and that, when inserted, are shifted in a random direction, pattern by pattern.

\* \* \* \* \*